US012083798B2

(12) United States Patent
Schina

(10) Patent No.: US 12,083,798 B2
(45) Date of Patent: Sep. 10, 2024

(54) THERMAL INKJET PRINTHEAD, A PRINTING ASSEMBLY COMPRISING THE THERMAL INKJET PRINTHEAD AND A PRINTING APPARATUS COMPRISING THE THERMAL INKJET PRINTHEAD

(71) Applicant: SICPA HOLDING SA, Prilly (CH)

(72) Inventor: Paolo Schina, Turin (IT)

(73) Assignee: SICPA HOLDING SA, Prilly (CH)

( * ) Notice: Subject to any disclaimer, the term of this patent is extended or adjusted under 35 U.S.C. 154(b) by 136 days.

(21) Appl. No.: 17/801,982

(22) PCT Filed: Feb. 23, 2021

(86) PCT No.: PCT/EP2021/054363

§ 371 (c)(1),
(2) Date: Aug. 24, 2022

(87) PCT Pub. No.: WO2021/170543

PCT Pub. Date: Sep. 2, 2021

(65) Prior Publication Data

US 2023/0108975 A1 Apr. 6, 2023

(30) Foreign Application Priority Data

Feb. 24, 2020 (EP) .................................... 20158952

(51) Int. Cl.
*B41J 2/14* (2006.01)

(52) U.S. Cl.
CPC ................................. *B41J 2/14129* (2013.01)

(58) Field of Classification Search
CPC .......................... B41J 2/14072; B41J 2/14129
See application file for complete search history.

(56) References Cited

U.S. PATENT DOCUMENTS 6,123,419 A 9/2000 Cleland
6,139,131 A * 10/2000 Prasad .................. B41J 2/0457
347/63

(Continued)

FOREIGN PATENT DOCUMENTS

| | | | |
|---|---|---|---|
| EP | 1563999 | 8/2005 | |
| WO | 2001003934 | 1/2001 | |
| WO | WO-0103934 A1 * | 1/2001 | ............ B41J 2/1404 |

OTHER PUBLICATIONS

International Search Report and Written Opinion issued with respect to application No. PCT/EP2021/054363.

*Primary Examiner* — Bradley W Thies
(74) *Attorney, Agent, or Firm* — Muncy, Geissler, Olds & Lowe, P.C.

(57) ABSTRACT

The present invention proposes a thermal inkjet printhead, as well as a printing assembly and printing apparatus comprising the same. The thermal inkjet printhead of the present invention comprises: a substrate; a nozzle layer, including a plurality of nozzles formed therethrough; a plurality of ink ejection chambers corresponding to the plurality of nozzles; a plurality of heater resistors formed on the substrate and corresponding to the plurality of ink ejection chambers, each of the heater resistors being located in a different one of the ink ejection chambers so that ink drop ejection through each of the nozzles is caused by heating of one of the heater resistors that is located in the corresponding ink ejection chamber; a plurality of separated cavitation islands formed on and corresponding to the plurality of heater resistors, each of the cavitation islands covering a different one of the heater resistors; and a dielectric layer interposed between the heater resistors and the cavitation islands. Using the present invention can help to enhance and substantially improve the printhead reliability, increasing in turn the yield of the manufacturing process.

10 Claims, 7 Drawing Sheets

(56) References Cited

U.S. PATENT DOCUMENTS

| | | | |
|---|---|---|---|
| 6,441,838 | B1 | 8/2002 | Hindman et al. |
| 6,582,062 | B1 | 6/2003 | Childers et al. |
| 2018/0290449 | A1 | 10/2018 | White et al. |

* cited by examiner

THERMAL INKJET PRINTHEAD, A PRINTING ASSEMBLY COMPRISING THE THERMAL INKJET PRINTHEAD AND A PRINTING APPARATUS COMPRISING THE THERMAL INKJET PRINTHEAD

FIELD OF THE INVENTION

The present invention relates to the field of thermal inkjet printing technology, and in particular, to a thermal inkjet printhead.

BACKGROUND OF THE INVENTION

Thermal inkjet printing technology has been relatively well developed. There have been various thermal inkjet printheads. For example, U.S. Pat. No. 6,123,419A discloses a thermal inkjet printhead employing a higher resistance value segmented heater resistor in order to overcome inefficient power dissipation in parasitic resistances. U.S. Pat. No. 6,582,062B1 discloses a large array inkjet printhead employing a multiplexing device to reduce parasitic resistance and the number of incoming leads.

In a thermal inkjet printhead, ejection of an ink drop through a nozzle is accomplished by quickly heating a volume of ink residing within an ink ejection chamber, and heating of the ink is accomplished by a short current pulse applied to a heater resistor positioned within the ink ejection chamber. The heating of the ink causes an ink vapor bubble to form and expand rapidly, thus forcing the liquid ink through the nozzle. Once the pulse ends and an ink drop is ejected, the ink ejection chamber refills with ink by an ink channel. The heater resistor is made of a resistive film, and a thermal inkjet printhead comprises a plurality of such heater resistors as a resistor array. The heater resistors are electrically connected to associated logic circuitry and power circuitry by conducting traces and/or pads so that each of the heater resistors can be controlled appropriately. In implementing the logic circuitry and power circuitry, metal lines are used.

In the prior art thermal inkjet printhead device, usually all the heater resistors are covered by a continuous protective layer, which prevents the underlying resistive films from being damaged by abrupt collapse of ink vapor bubbles during operation of the printhead. For this purpose, some refractory metal, like Tantalum, is used for the protective layer, which shows both great mechanical strength and good thermal conductivity. Such a Tantalum film is commonly deposited continuously in the entire resistor area, spanning the whole resistor array. Because of the electrical conductivity of Tantalum, a large area of the device turns out to be covered by the continuous Tantalum conductive film. On one hand, since voltage levels in metal lines across the device do change in time, this Tantalum conductive film could be capacitively coupled with the neighboring metal lines beneath it and therefore it could cause some issue with the logical circuitry. On the other hand, possible pinholes or discontinuities in a dielectric layer interposed between the Tantalum layer and the underlying metal lines could give rise to parasitic electrical shorting paths, whose effect could cause both electrical drawbacks and electrochemical effects through ink. U.S. Pat. No. 6,441,838 B1 discloses such an ink jet printhead comprising a tantalum passivation layer to provide mechanical passivation for the ink firing resistors by absorbing the cavitation pressure of the collapsing drive bubble, where the tantalum passivation layer is disposed over the heater resistors, extending beyond the ink chambers and over associated ink channels.

SUMMARY OF THE INVENTION

It is an object of the present invention to provide a solution that can alleviate or solve at least some of the above problems in the prior art. The mentioned problems are solved by the subject-matter of the independent claims. Further preferred embodiments are defined in the dependent claims.

According to an aspect of the present invention, there is provided a thermal inkjet printhead, which comprises:

- a substrate;
- a nozzle layer, including a plurality of nozzles formed therethrough;
- a plurality of ink ejection chambers corresponding to the plurality of nozzles;
- a plurality of heater resistors formed on the substrate and corresponding to the plurality of ink ejection chambers, each of the heater resistors being located in a different one of the ink ejection chambers so that ink drop ejection through each of the nozzles is caused by heating of one of the heater resistors that is located in the corresponding ink ejection chamber;
- a plurality of separated cavitation islands formed on and corresponding to the plurality of heater resistors, each of the cavitation islands covering a different one of the heater resistors; and
- a dielectric layer interposed between the heater resistors and the cavitation islands, wherein the dielectric layer is a composite film made of Silicon nitride and Silicon carbide and having a thickness in the range of about 0.4 to about 0.65 μm.

According to another aspect of the present invention, there is provided a printing assembly comprising the thermal inkjet printhead described above.

According to yet another aspect of the present invention, there is provided a printing apparatus, for example, a printer, comprising the thermal inkjet printhead described above.

With the solution of the present invention, overlapping of each cavitation island with its neighboring circuitry can be reduced, and therefore the likelihood of generating parasitic capacitive coupling between the cavitation layer and its neighboring circuitry is dramatically reduced compared with that with the prior art. Moreover, due to the relatively small surface area of a single cavitation island, it is less likely that the cavitation island overlaps with a possible defect in the thin dielectric film beneath it, i.e., the probability that a defect in the dielectric film lies just below some cavitation island and thus causes some electrical short circuit is reduced. Thus, due to the specific composition and thickness of the dielectric layer (which is far thinner than the ones in the prior art), providing the "electrically" insulated cavitation islands is clearly advantageous. As a result, the present invention provides an optimized heat transfer with a reduced risk to have pinholes with unwanted conductive bridges between different layers. Therefore, using the present invention can help to substantially improve the printhead reliability, increasing in turn the yield of the manufacturing process.

BRIEF DESCRIPTION OF THE DRAWINGS

Non-limiting and non-exhaustive embodiments of the present invention are described by way of example with reference to the following figures, in which.

DETAILED DESCRIPTION OF THE EMBODIMENTS

In order to make the above and other features and advantages of the present invention more apparent, the present invention is further described below in conjunction with the accompanying drawings. It is to be understood that the specific embodiments given herein are for the purpose of explaining to those skilled in the art, and are only illustrative but not restrictive.

Figure 1:
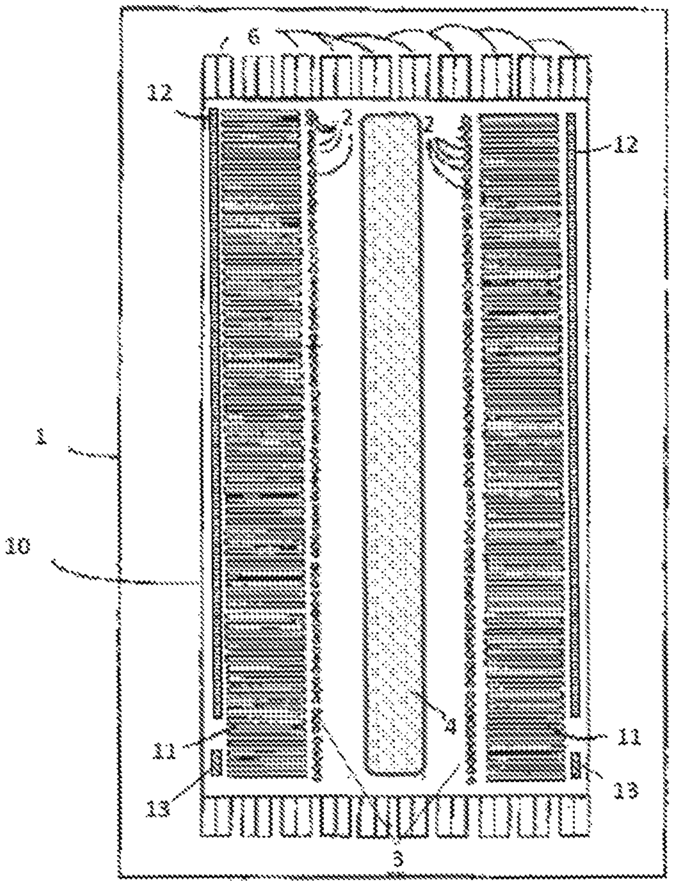
FIG. 1 is a schematic diagram illustrating an exemplary layout of a thermal inkjet printhead according to an embodiment of the present invention.
Figure 2:
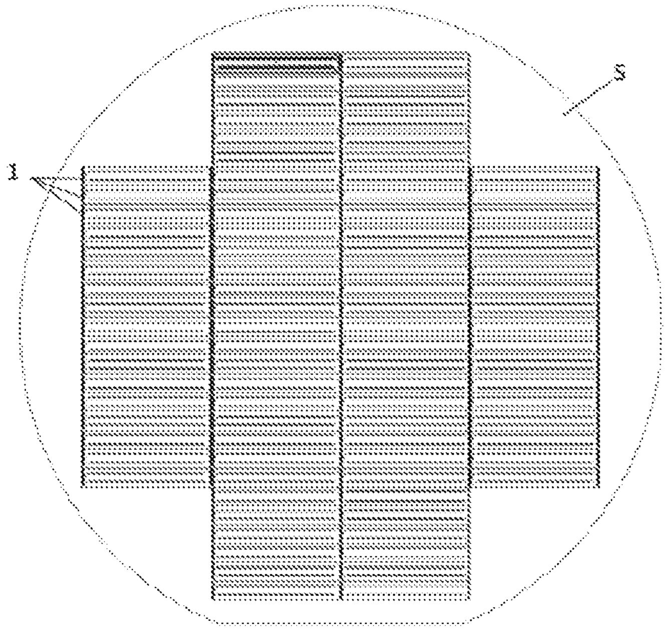
FIG. 2 is a schematic diagram illustrating an exemplary wafer before being diced.

FIG. 1 schematically illustrates an exemplary layout of a thermal inkjet printhead according to an embodiment of the present invention. The thermal inkjet printhead in FIG. 1 comprises a substrate 1, which is provided on its surface with a plurality of heater resistors 2, arranged in one or more columns 3. The thermal inkjet printhead may be in the form of a chip. As shown in FIG. 2, multiple such chips, each being carried by a substrate 1, can be manufactured in a single silicon wafer 5, which is subsequently diced into individual chips, using a proper semiconductor technology, including thin film deposition, photolithography, wet and dry etching techniques, ion implantation, oxidation, etc. The columns of the heater resistors 2 can be positioned in close proximity to a through-slot 4 made in an internal part of the printhead chip to allow ink refilling. Each of the heater resistors 2 can be made of a resistive film, and can be contacted with corresponding conducting trace(s). In a peripheral region of the printhead, there may be a set of contact pads 6, which are bonded to a flexible printed circuit, normally using a TAB (Tape Automated Bonding) process. Each of the heater resistors can be electrically connected to the flexible printed circuit via corresponding conducting trace(s) and corresponding contact pad(s) 6. In an active part 10 of the substrate 1, there can be present arrays of MOS transistors 11 for addressing of the resistors, one or more logic circuitries 12, one or more programmable memories 13 and other possible components, especially when the electronic layout associated with the heater resistors becomes relatively complex as the number of the heater resistors increases. In addition to the resistive films forming the heater resistors, the thermal inkjet printhead of the present application can comprise other layers/films, which will be described later.

Figure 3:
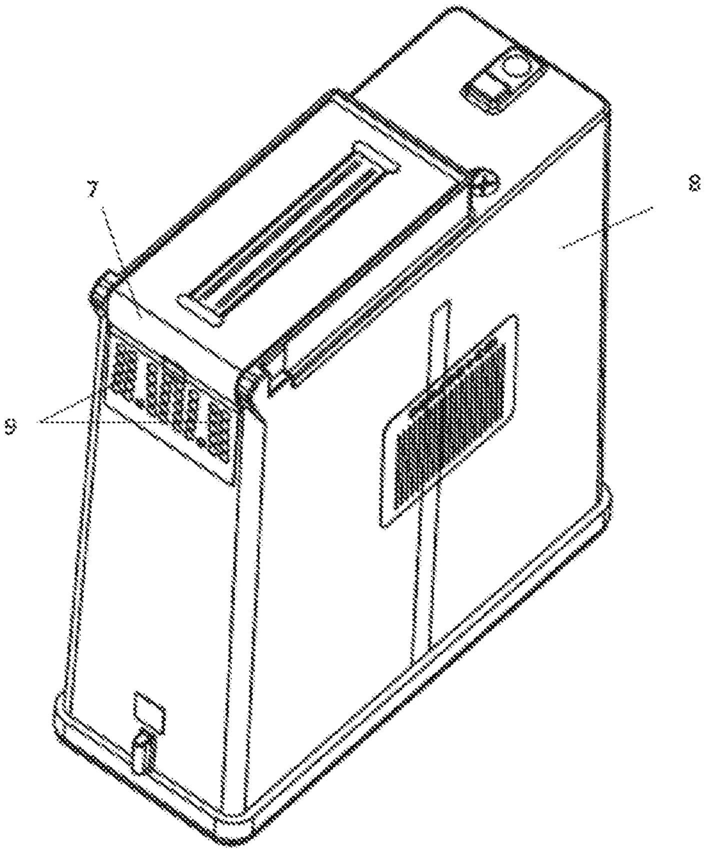
FIG. 3 schematically illustrates a perspective view of an exemplary printing assembly incorporating the thermal inkjet printhead of the present invention.

With reference to FIG. 3, which shows a printing assembly incorporating the present invention, a flexible printed circuit 7 is attached to a printhead cartridge body 8, and a thermal inkjet printhead of the present invention can be mounted and connected to the printhead cartridge body 8. The flexible printed circuit 7 is provided with larger contact pads 9 to exchange electrical signals with a printer used with the thermal inkjet printhead. The thermal inkjet printhead, for example, the one shown in FIG. 1, can be mounted and connected to the printhead cartridge body 8 in any suitable manner.

Figure 4:
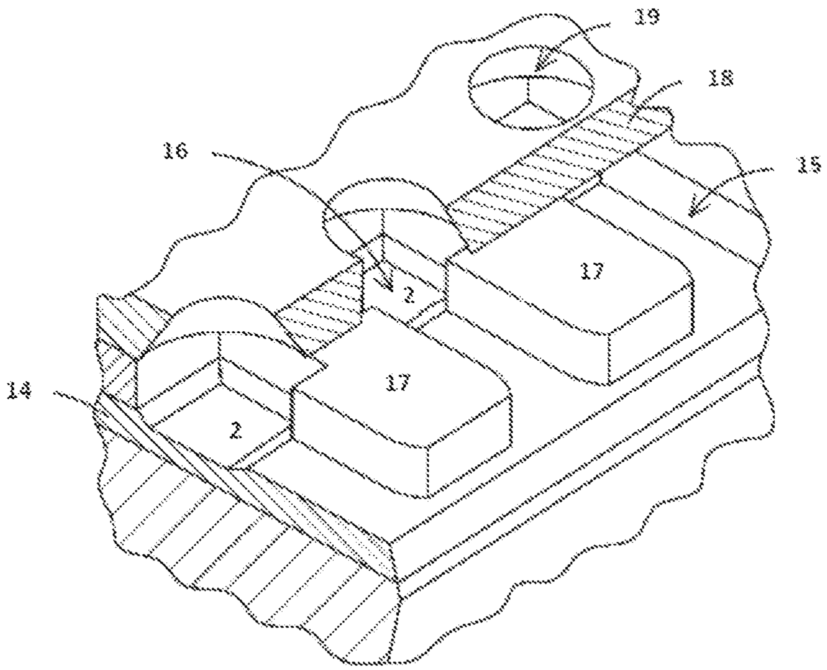
FIG. 4 schematically illustrates a portion of an exemplary microfluidic circuit in a perspective view.
Figure 5:
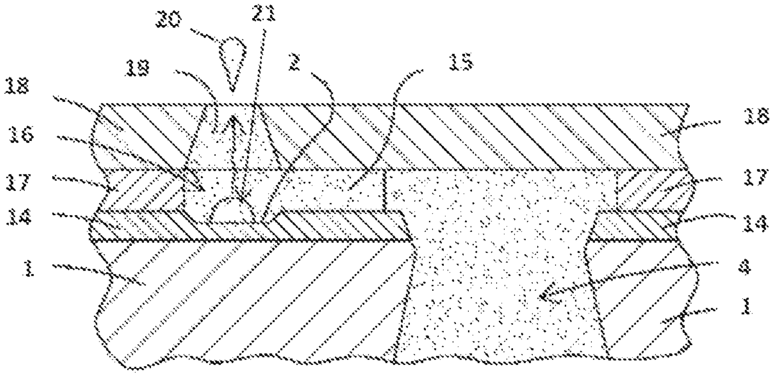
FIG. 5 schematically illustrates a portion of the microfluidic circuit in FIG. 4 in a cross-sectional view.

With reference to FIG. 4 and FIG. 5, on the substrate surface of the thermal inkjet printhead of the present invention, where a stack of resistive, conductive and dielectric films have been deposited and patterned, as schematically represented at the region 14, a microfluidic circuit can be deposited and realized so that ink can flow in the deposited microfluidic circuit through suitable channels 15 and arrive at an ink ejection chamber 16, whose walls surround a corresponding heater resistor 2. The channels 15 are in fluid communication with the through-slot 4, which can lead to an ink reservoir (not illustrated). The microfluidic circuit is often patterned in a suitable polymeric layer 17 called a barrier layer. A nozzle layer 18, for example in the form of a plate, is provided above the barrier layer. A plurality of nozzles 19, each being aligned with an underlying heater resistor, can be formed through the nozzle plate 18, and from the nozzles, ink droplets 20 are ejected. During operation of the thermal inkjet printhead, if a heater resistor 2 is required to be activated, a short current pulse is applied to heat the resistor, which in turn causes vaporization of a thin layer of ink just above the resistor and thus forming of a vapor bubble 21. The pressure in the vaporized layer increases suddenly. causing ejection of a portion of the overlying liquid ink from the corresponding nozzle above the activated resistor. The ink droplet travels toward a medium (e.g., a piece of paper), producing an ink dot on the medium's surface. After that, new ink is drawn into the ink ejection chamber 16, to replace the ejected droplet, until a steady state is reached.

To optimize energy transfer from the heater resistor 2 (heated by the current pulse through Joule effect) to the ink, it is necessary that the resistor is thermally insulated from the substrate, so that the heat flow takes place preferably towards the overlying ink, which is in turn separated from the resistive film layer by a thin dielectric film to avoid electrical leakage. The substrate can be made of silicon, which has an appreciable thermal conductivity, in which case, it is necessary to interpose an insulating layer with enough thickness between the substrate and the resistor: in other words, the resistor should be deposited over a suitable insulating layer grown or deposited onto the substrate. Thermally grown silicon oxide and BPSG (Boron Phosphorus Silicon Glass), produced with high-temperature processes, are both suitable materials for thermal insulation of the resistor, and can be used alone or in combination. Since the temperature for growth or deposition and/or annealing of these materials is higher than the operating temperature of the heater resistors in the printhead, they will remain stable during normal operation of the printhead.

The resistive film, which undergoes rapid and large temperature changes during operation of the printhead, should have stable properties and a good resistance to a thermo-mechanical stress. Typically, the resistance value of a heater resistor 2 is several tens Ohms: a square-shaped heater resistor with a resistance of about 30 Ohms is often adopted, although different shapes and different resistance values can be adopted. A widespread and long-lasting choice for the heater resistor is a composite film made of Tantalum-Aluminum alloy: a film thickness of about 900 Angstrom gives a sheet resistance of 30 Ohms-per-square, i.e. a square-shaped resistor made of such a film has a resistance of 30 Ohms. According to a preferable embodiment of the present invention, the heater resistors are U-shaped heater resistors, which means that there is a gap between nearby conductors biased at different voltages.

Various known solutions to address and drive multiple heater resistors are available. If the number of the nozzles in the printhead is relatively low, up to several tens, each heater resistor can be connected directly through an electrical track to a corresponding contact pad, while the return of current can be commonly collected by one or a few ground pads. As the number of the nozzles increases, direct individual driving, which necessitates a large number of contact pads for addressing the resistors, is difficult to realize: in fact, the pads are usually distributed along an outer border of the printhead chip and the number thereof cannot increase without any limit. A more practical solution is adopting an addressing matrix, which allows driving of a great number of resistors using a reduced number of contact pads. The addressing matrix is preferably realized with a plurality of MOS transistors, each of which is in electrical communication with a determined heater resistor. Individual heater resistors can be connected to electrodes of the transistor matrix in a suitable way so that they can be activated on demand, causing ejection of ink droplets from the printhead.

As indicated above, the dielectric layer above the heater resistor provides electrical insulation to the ink: generally, a silicon nitride film, alone or in combination with silicon carbide, is used to form the dielectric layer for this purpose. The insulating film for the dielectric layer should be thin enough to allow a strong heat flow while enduring thermo-mechanical stresses experienced during operation of the printhead as well as shocks due to the bubble collapse. According to the present invention, the dielectric layer is a composite film made of Silicon nitride and Silicon carbide, whose thickness is, at least, 4000 Angstrom (0.4 μm) and, at most, 6500 Angstrom (0.65 μm). In fact, rapid expansion of the vapor bubble due to heating of the heater resistor has the effect of largely reducing the bubble's internal pressure, to a level well below the external atmospheric pressure. At the maximum of the bubble's expansion, the bubble turns out to be a cavity with a low pressure inside, limited in its lower portion by the ink ejection chamber's floor and surrounded by ink. The larger external atmospheric pressure pushes back the liquid ink lying above the cavity, causing a violent impact against the chamber's floor. This impact, which is consequent to the collapse of the cavity previously formed in the ink, can damage the films which constitute the chamber's floor, i.e. the resistive film and the overlying insulating film. Often the thin insulating film is not sufficiently strong and an additional protective film, called a cavitation layer, for example made of a refractory metal, like Tantalum, is deposited above the insulating film. The Tantalum film is thermally conductive and strong heat flux from the resistive film towards the ink is maintained, even though the additional layer is present. According to the present invention, a novel arrangement for the cavitation layer is proposed. The concept is to reduce the area of the film surface of the cavitation layer without affecting its function. In particular, the cavitation layer can consist of a plurality of separated cavitation islands, each being patterned above a corresponding one of the heater resistors. Such a cavitation layer will be further described later with reference to FIG. 7.

Figure 6:
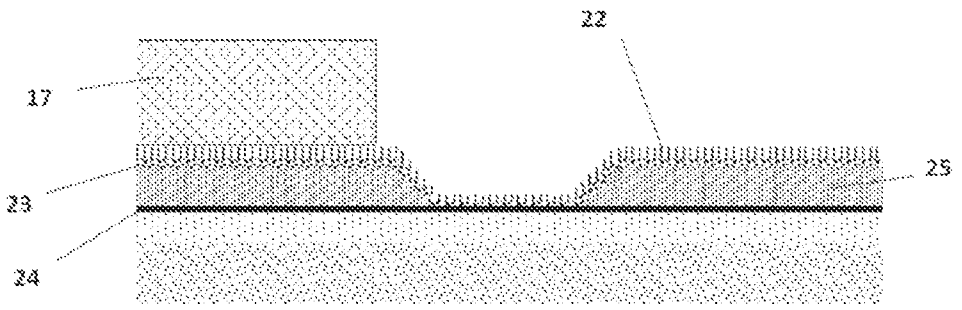
FIG. 6 is a cross-sectional view schematically illustrating a portion of FIG. 5 in more detail.

The schematic representation of the region 14 in FIG. 5, comprising the resistive layer, the dielectric layer and the cavitation layer, can be observed in more detail in the cross-sectional view of FIG. 6. Below the barrier layer 17 there is the cavitation layer 22, which is deposited onto the dielectric film 23 as a protection. In the heater resistor area shown, the dielectric film 23 is placed directly onto the resistive film 24, while just outside the heater resistor, where conductive metal lines 25 are realized, the dielectric film 23 is deposited above conductors. In a preferred embodiment, the cavitation layer is made of Tantalum, but other choices can be made, and such choices may be known in the art.

Figure 7:
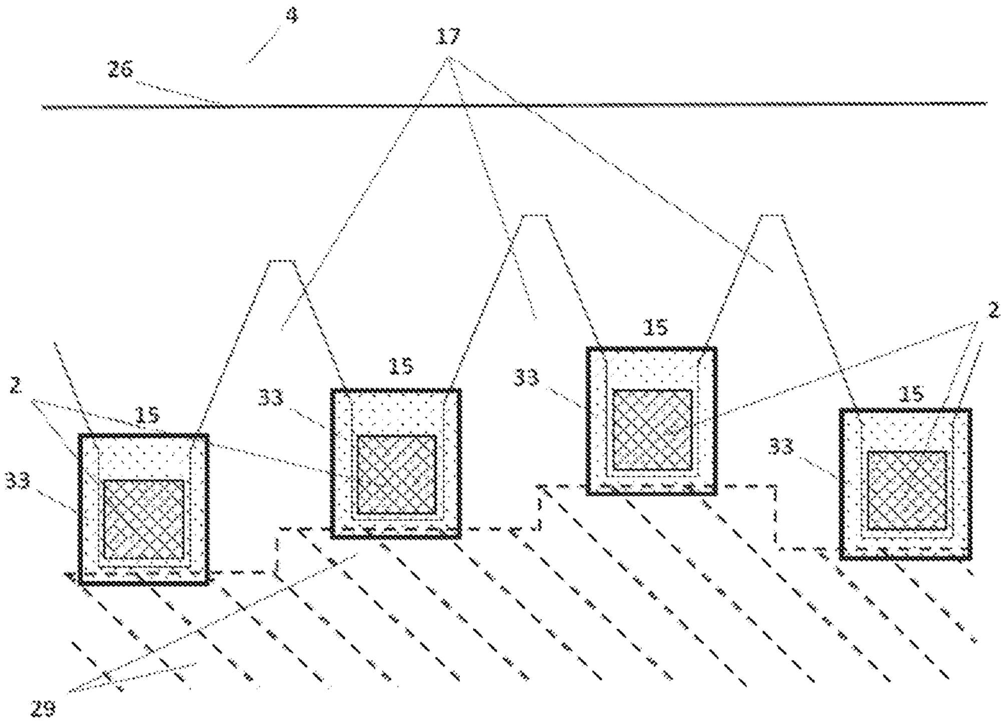
FIG. 7 schematically illustrates a portion of the thermal inkjet printhead in FIG. 1.

FIG. 7 schematically illustrates a portion of the thermal inkjet printhead in FIG. 1. As shown in FIG. 7, a series of heater resistors 2 are surrounded by the barrier layer 17 so that each of the heater resistors 2 is housed in an ink ejection chamber defined by two vertical walls of the barrier layer 17. Ink flows from an edge 26 of the through-slot 4 through the channels 15 towards the ink injection chambers. In this embodiment, the slot edge is a straight line, but the edge shape which follows the staggered placement of the heater resistors, so as to equalize the refilling time for all of them, can be adopted.

In FIG. 7, a plurality of cavitation islands 33, which collectively constitute a cavitation layer together, are shown. Such a cavitation layer can be referred to as a split cavitation layer or a segmented cavitation layer, and each of the cavitation islands can be also referred to as a cavitation segment. These cavitation islands 33 are separated from one another. Each cavitation island 33 corresponds to and covers a single different heater resistor 2, and its area can be just larger than the area of the resistor covered by it. Each cavitation island 33 can consist of a piece of Tantalum, although other suitable materials, especially refractory conductive materials, can be used.

In one preferred embodiment, the cavitation islands 33 can be floating, i.e. not connected to any voltage source.

Each cavitation island 33 has only a small overlapping area with its neighboring circuitry 29, and therefore the likelihood of generating parasitic capacitive coupling due to the presence of the cavitation layer is dramatically reduced compared with that with the prior art. Moreover, since the overall area covered by the segmented cavitation layer is relatively small, the probability of having unwanted possible pinholes or discontinuities in the dielectric layer between the cavitation layer and the underlying metal lines that are directly beneath the cavitation islands can be also dramatically reduced. Besides, using the novel layout helps to increase the distance between the cavitation layer and the underlying logical circuitry, reducing the possible parasitic capacitance and capacitive coupling. Using the segmented cavitation layer as shown in FIG. 7 can help to enhance and substantially improve the printhead reliability, increasing in turn the yield of the manufacturing process.

Although the presence of the segmented cavitation layer may make the surface, onto which the barrier layer 17 is deposited, a bit rough, deposition and subsequent patterning of the barrier layer can be carried out anyhow, providing a flat surface and a good adhesion in the vicinity of the resistor array.

The advantages of the thermal inkjet printhead of the present invention adopting the above segmented cavitation layer, including those mentioned above, over the prior art, will become more apparent from the following description.

Figure 8:
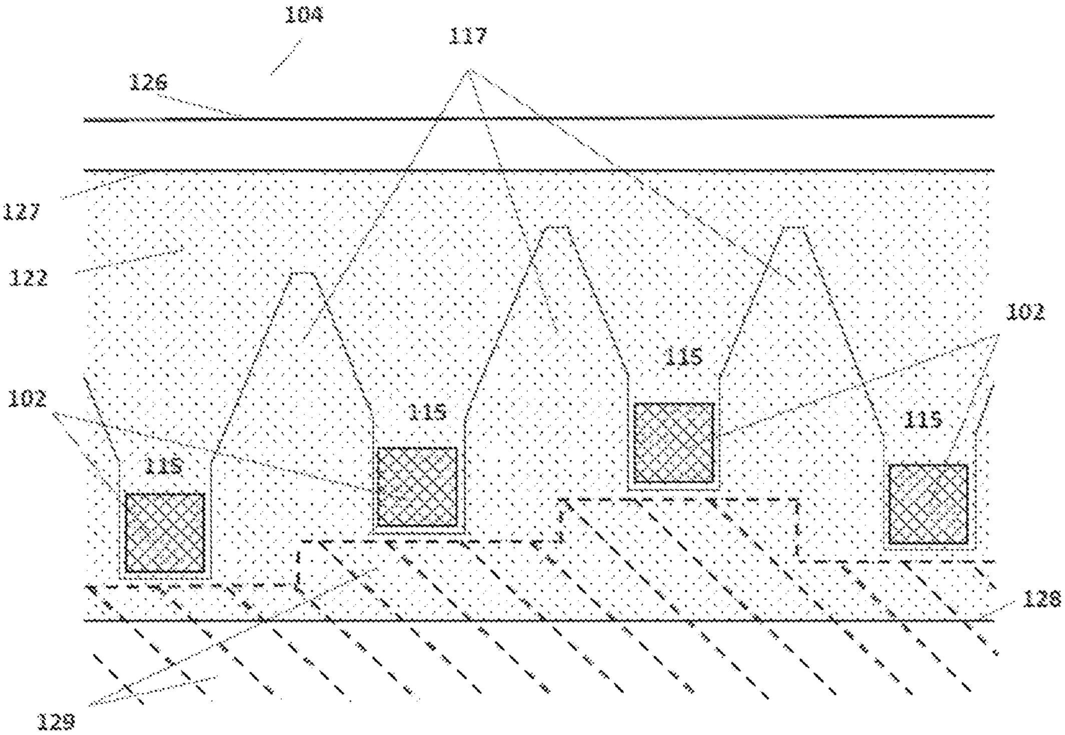
FIG. 8 schematically illustrates a portion of a thermal inkjet printhead of the prior art.

FIG. 8 schematically illustrates a portion of a prior art thermal inkjet printhead device. As shown in FIG. 8, a series of heater resistors 102 are surrounded by a barrier layer 117, whose vertical walls bound ink ejection chambers corresponding to the heater resistors. Ink flows from an edge 126 of a through-slot 104 through channels 115 towards the chambers.

A front edge 127 of a continuous cavitation layer 122, schematically represented by the dotted region, lies at a certain distance from the slot edge 126, in order to prevent the slot formation process from damaging the layer. The same caution is taken also for a dielectric layer (not illustrated) below the cavitation layer. The edges of the mentioned layers don't necessarily need to be coincident: the dielectric layer's edge can be closer to the slot edge 126 than the cavitation layer's edge, or the contrary can happen, without affecting the reliability of the device. A rear edge 128 of the cavitation layer 122 lies well behind the resistors 102. There are several reasons for such an implementation: the cavitation layer of Tantalum generally provides a good adhesion to the overlying barrier layer, which is highly desired in a region where the hermeticity around a chamber and between adjacent chambers is of paramount importance to guarantee the device's correct performance. This adhesion is even more improved by continuity of the Tantalum layer's surface near the ejection area of the device, because smooth topography, without sharp edges, renders easier deposition and patterning of the polymeric barrier layer.

Nevertheless, there are drawbacks arising from the large area covered by the Tantalum cavitation layer 122, as will be shown in the following.

The printhead device is controlled and powered through a suitable electrical circuitry 129, schematically represented by the dashed region, which comes in close proximity to the ejection area and therefore it is partially overlapped by the Tantalum cavitation layer, though the circuitry and the cavitation layer are separated by the interposed dielectric layer made of Silicon nitride and Silicon carbide.

The Tantalum cavitation layer and metal lines of the underlying electrical circuitry, separated by the thin dielectric layer, act together as a plurality of capacitors, although they have not been designed for that purpose. Even though these parasitic capacitors don't belong to the electrical circuitry of the device, they can nonetheless have unexpected and undesired effects on the device behavior, mainly if there exist sophisticated logical circuits. The presence of the parasitic capacitors throughout the device is due to the close proximity of conductive parts, either because they are side-by-side, separated by a small gap, or because they are stacked with an insulating layer therebetween. It is difficult to avoid the presence of parasitic effects in a monolithic electronic device, since cost requirements on the fabrication process urge designers to increase surface density of electrical components, entailing in turn the higher risk of being prone to parasitic effects.

Due to the large surface of the Tantalum cavitation layer, there is a big number of conductive lines belonging to the underlying level which can be overlapped by the Tantalum plate itself and, therefore, there is also a big number of parasitic capacitors having the upper Tantalum plate as an upper electrode. Since the lower conductive lines can find themselves at a voltage level which is dynamically changing with time, according to the mode of operation of the device, this could cause some capacitive coupling between different conductors of the lower level during the voltage commutations.

Figure 9A:
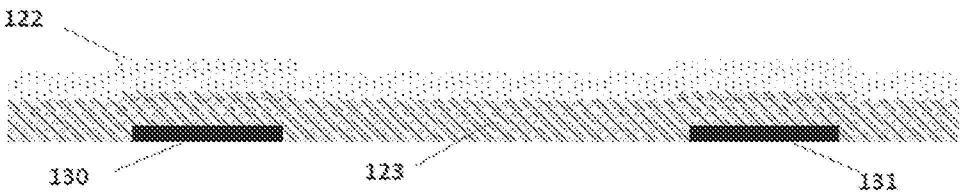
FIG. 9*a*, FIG. 9*b* and FIG. 9*c* illustrate a possible situation for the thermal inkjet printhead whose portion is illustrated in FIG. 8, an equivalent circuit corresponding to the situation, and a modified version of the equivalent circuit, respectively.
Figure 9B:
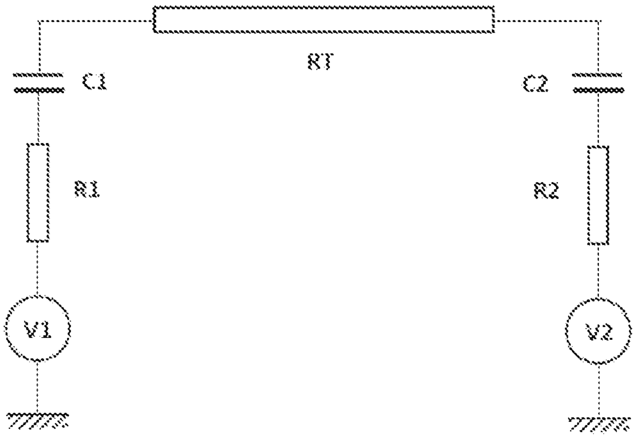

As an example, in FIG. 9*a* a situation is depicted in a cross-sectional view: there are two conductive lines 130 and 131, which are not necessarily close together. Both lines are covered by the dielectric layer 123, which is, in turn, overlapped by the wide continuous cavitation layer 122. At a certain time, the conductive lines 130 and 131, also referred to as conductors, could be set at voltages V1 and V2, respectively, as shown in FIG. 9*b*, which depicts a simplified equivalent circuit corresponding to this situation. In FIG. 9*b*, a resistance value RT of conductive paths through the Tantalum layer 122, as well as resistance values R1 and R2 of the conductive lines 130 and 131 are taken into account.

Following the model of FIG. 9*b*, if a value of the voltage V1 undergoes a sudden change ΔV, as in a step-like waveform, it causes an abrupt perturbation on a lower plate of a capacitor C2, corresponding to the conductor 131. It is easy to see, for those skilled in the art, that the magnitude and the trend of the perturbation on the conductor 131, as compared with ΔV, do depend on the resistance values R1, R2 and RT as well as on capacitive values of the capacitors C1 and C2. In general, immediately after the voltage V1 changes, the sudden change ΔV is distributed across resistors having the resistance values R1 and R2 shown in FIG. 9*b*, since the capacitors behave as a short circuit for a sudden voltage variation. Therefore, if R1 and RT<<R2, the sudden change ΔV turns out to be, at first, almost completely transferred to the conductor 131. Subsequently, due to the progressive charge accumulation on the plates of the capacitors, the system tends to reach a new stationary state after a certain time period, when the magnitude of the perturbation falls almost to zero: the larger the capacitance values of the parasitic capacitors C1 and C2, the longer the lasting time of the perturbation.

A similar situation can be found, for instance, when the conductor 131 is connected to the gate of a MOS transistor. In most cases, a transistor gate in a circuit is not left in a floating state, and it can be connected to ground through a pull-down or a pull-up resistor, whose resistance value is remarkably larger than that of conductive layers; therefore, the condition R1 and RT<<R2 is fulfilled. A sudden change in the voltage V1 could lead to unwanted commutation of the transistor state, if the perturbation on the gate electrode lasts long enough. This can cause misfunctioning in the device, mainly when the perturbed gate is part of a logical circuit and some undesired operation can be triggered by this electrical disturbance. Even more, since in the printhead the power lines which energize the nozzle heater resistors are often biased at a voltage higher than 10 Volts, while typically the power supply of the logical circuitry lies in a range of 3 to 5 Volts, a sudden voltage change in the power lines parasitically coupled to the logical transistors could cause severe effects on the latter, even if the disturbance on the gate is attenuated with respect to ΔV.

Increasing the thickness of the dielectric layer 123 in order to lower the capacitive values of the parasitic capacitors C1 and C2, which reduces in turn the perturbation lasting time, is not recommendable, since the effectiveness of heat transfer from the heater resistors to ink takes advantage of a thin dielectric layer. On the other hand, using two different thicknesses of the dielectric layer for the heater resistor region and for the circuitry behind represents a complication of the manufacturing process and thus a higher cost.

Figure 9C:
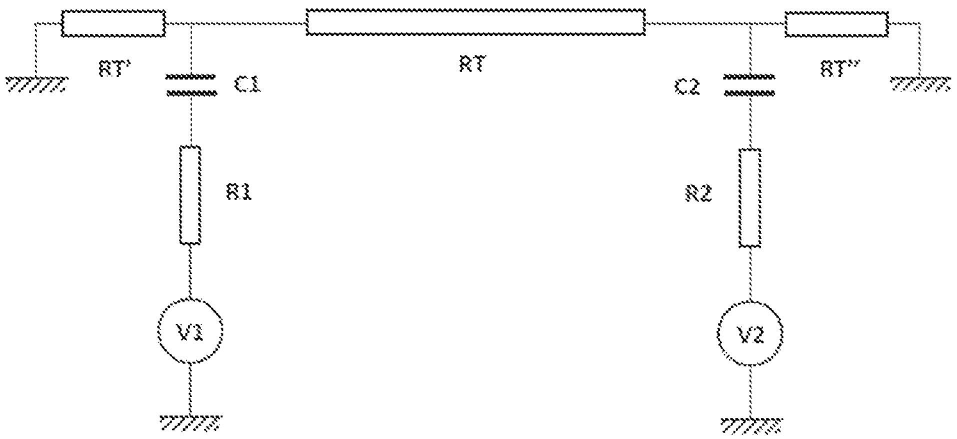

A possible solution to fix this issue could be obtained by connecting the Tantalum cavitation layer to ground, in order to decouple from each other the parasitic capacitors, as depicted in FIG. 9*c*, in which resistance values RT' and RT" of conductive paths from the Tantalum cavitation layer to ground are reflected. This implementation turns out to be highly effective in reducing cross-talking caused by the capacitive coupling with the cavitation layer; nevertheless, this implementation is prone to increase the probability of undergoing other drawbacks.

In fact, during fabrication of the device, many processes, like deposition, patterning and etching, follow one another and often it is impossible to avoid the presence of some defect in the layers of the device. For example, when residual particles are left onto a surface after an etching process, they can compromise the integrity of the subsequent layer, deposited immediately above. If this layer is a dielectric film, pinholes or zones with lack of material can arise throughout the film surface, compromising the uniformity of insulation. If a conductive layer is deposited above the defective dielectric layer, some of the conductive material could penetrate through the holes on the film and, in the worst case, it can possibly make some contact with conductive track(s) lying below the insulating dielectric layer itself. This is likely to happen when the upper conductive layer covers a large surface area, as for the continuous cavitation layer according to the prior art: the large overlapping area increases the probability of Tantalum intercepting some through-hole in the dielectric film which is, in turn, just above a conductive track, as depicted in FIG. 10*a*.

Figure 10A:
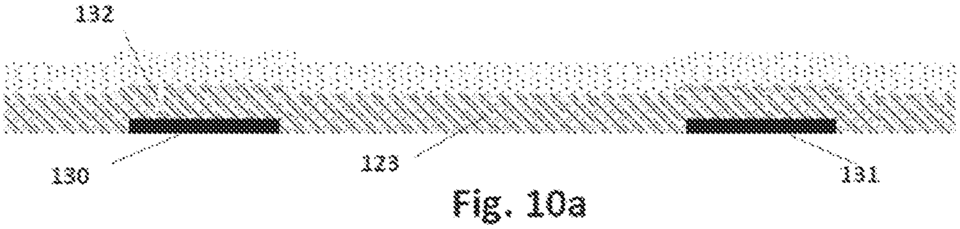
FIG. 10*a*, FIG. 10*b* and FIG. 10*c* illustrate another possible situation for the thermal inkjet printhead whose portion is illustrated in FIG. 8, one possible equivalent circuit corresponding to the situation, and another possible equivalent circuit corresponding to the situation, respectively.
Figure 10B:
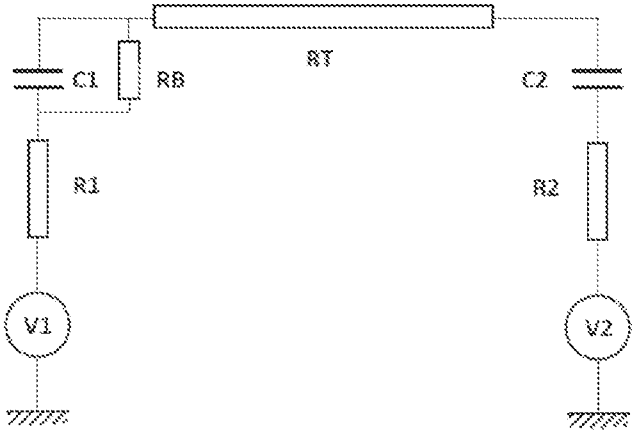

FIG. 10*a* illustrates a cross-sectional view of a layer stack where a defect, particularly a through-hole, in the intermediate dielectric layer 123, has been filled by the material of the topmost cavitation layer, generating a conductive bridge 132 towards the underlying conductive track 130. This defect would act as a short circuit or, at least, as a resistive path between two conductive layers, which should be electrically insulated in a defect-free device. Depending on whether the cavitation layer is left floating or connected to ground, an equivalent circuit corresponding to this situation can be as shown in FIG. 10*b* or in FIG. 10*c*. The conductive bridge 132 between the metal cavitation layer and the underlying metal track 130 is represented by a resistor RB.

In the case represented in FIG. 10*b*, the whole floating cavitation layer is brought to the same potential V1 as applied to the conductor 130. The parasitic capacitive coupling between the cavitation layer and the underlying circuitry becomes even stronger because the voltage V1 directly affects the Tantalum cavitation layer, even when the voltage V1 is a variable quantity. In addition, since very often ink exhibits a certain amount of electrical conductivity, other electrical issues could be spread across the device circuitry by the defect in the dielectric film; moreover, also electrochemical effects involved with ink could take place, perhaps closing a current path through the bulk of the silicon die.

Figure 10C:
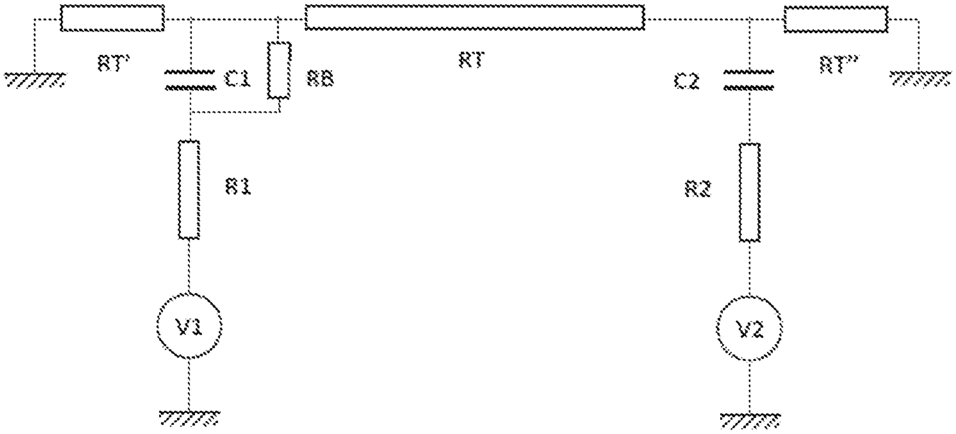

On the other hand, in the case illustrated in FIG. 10*c*, in which resistance values RT' and RT" of conductive paths from the Tantalum cavitation layer to ground are shown, the voltage at the cavitation layer is stuck to ground, which suppresses or largely reduces the possible effects of a capacitive coupling involved with the Tantalum film. However, if the voltage V1 is different from zero (assumed as the value of the ground potential), a short circuit or a low resistivity current path will be established, having detrimental effects on the device integrity: in most cases these issues can be detected during electrical testing of the device performed during fabrication, which causes in turn rejection of the device and therefore reduces the yield of the manufacturing process.

In summary, the presence of a large, continuous cavitation layer in the prior art thermal inkjet printhead entails several critical aspects, whatever its electrical state is. On the other hand, there is a need to prevent the films in the ejection region from being damaged by the collapse of vapor bubbles during operation of the printhead.

In contrast, with the solution of the present invention adopting the novel layout of the cavitation layer as described above, the presence of the cavitation layer is maintained only in a smaller region which encompasses just the heater resistors of the resistor array, and the film surface area of the cavitation layer is reduced dramatically. Due to the reduced film surface area, it is less likely that the cavitation layer overlaps with a possible defect in the dielectric film beneath it, i.e., the probability that a defect in the dielectric film lies just below the cavitation layer and causes some electrical short circuit is reduced. On the other hand, using the novel layout helps to increase the distance between the cavitation layer and the underlying logical circuitry. The smaller cavitation layer area and the larger distance between the cavitation layer and the critical logical circuitry help to reduce the parasitic capacitance. Therefore, the thermal inkjet printhead of the present invention is more robust and less prone to unwanted electrical interferences.

Various technical features described above may be combined arbitrarily. Although not all possible combinations of these technical features are described, any combination of these technical features should be deemed to be covered by the present specification provided that there is no conflict for such a combination.

While the present invention has been described in connection with examples, those skilled in the art would understand that the above description and figures are only illustrative rather than restrictive, and the present invention is not limited to the disclosed examples. Various modifications and variations are possible without departing from the spirit of the present invention.

What is claimed is:

1. A thermal inkjet printhead, comprising:

a substrate;

a nozzle layer, including a plurality of nozzles formed therethrough;

a plurality of ink ejection chambers corresponding to the plurality of nozzles;

a plurality of heater resistors formed on the substrate and corresponding to the plurality of ink ejection chambers, each of the heater resistors being located in a different one of the ink ejection chambers so that ink drop ejection through each of the nozzles is caused by heating of one of the heater resistors that is located in the corresponding ink ejection chamber;

a plurality of separated cavitation islands formed on and corresponding to the plurality of heater resistors, each of the cavitation islands covering a different one of the heater resistors; and a dielectric layer interposed between the heater resistors and the cavitation islands, wherein the dielectric layer is a composite film made of Silicon nitride and Silicon carbide and having a thickness in the range of about 0.4 to about 0.65 μm, wherein the heater resistors are U-shaped heater resistors.

2. The thermal inkjet printhead according to claim 1, wherein each of the cavitation islands is made of a refractory metal film.

3. The thermal inkjet printhead according to claim 2, wherein the refractory metal film is a Tantalum film.

4. The thermal inkjet printhead according to claim 1, wherein each of the cavitation islands has a surface area that is minimized while being large enough for it to completely cover the corresponding one of the heater resistors.

5. The thermal inkjet printhead according to claim 1, further comprising: a barrier layer formed over the plurality of cavitation islands and below the nozzle layer, wherein the ink ejection chambers are defined by the barrier layer.

6. The thermal inkjet printhead according to claim 5, wherein the barrier layer is patterned to form a plurality of ink channels corresponding to the plurality of ink ejection chambers, each of the ink channels leading to a different one of the ink ejection chambers.

7. The thermal inkjet printhead according to claim 1, further comprising: an insulating layer interposed between the substrate and the heater resistors.

8. The thermal inkjet printhead according to claim 1, wherein each of the cavitation islands is floating.

9. A printing assembly, comprising the thermal inkjet printhead according to claim 1.

10. A printing apparatus, comprising the thermal inkjet printhead according to claim 1.

* * * * *